US012684410B2

(12) United States Patent (10) Patent No.: US 12,684,410 B2
Taneja (45) Date of Patent: Jul. 14, 2026

(54) RAN AND UE DRIVEN L4S MARKING AND PROCESSING FOR CONGESTION MANAGEMENT IN AN O-RAN BASED NETWORK ARCHITECTURE

(71) Applicant: Mavenir Systems, Inc., Richardson, TX (US)

(72) Inventor: Mukesh Taneja, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 285 days.

(21) Appl. No.: 18/443,430

(22) Filed: Feb. 16, 2024

(65) Prior Publication Data

US 2024/0334244 A1 Oct. 3, 2024

(30) Foreign Application Priority Data

Mar. 30, 2023 (IN) .............................. 202321024078

(51) Int. Cl.
H04L 43/0882 (2022.01)
H04W 28/02 (2009.01)
(Continued)

(52) U.S. Cl.
CPC ..... H04W 28/0284 (2013.01); H04L 43/0882 (2013.01); H04W 76/20 (2018.02); H04W 80/02 (2013.01); H04W 80/06 (2013.01)

(58) Field of Classification Search
CPC . H04W 28/0284; H04W 76/20; H04W 80/02; H04W 80/06; H04L 43/0882; H04L 47/263; H04L 47/30; H04L 47/33
See application file for complete search history.

(56) References Cited

U.S. PATENT DOCUMENTS 8,553,554 B2 * 10/2013 Kahn ................ H04W 28/0247
370/236
8,885,476 B2 * 11/2014 Kakadia ............ H04W 28/0273
370/235
(Continued)

FOREIGN PATENT DOCUMENTS

AU 2022470393 A1 * 10/2024 ........ H04W 28/0284
CN 102484819 A * 5/2012 .............. H04W 8/04
(Continued)

OTHER PUBLICATIONS

NPL RFC 9332 Dual-Queue Coupled Active Queue Management (AQM) for Low Latency, Low Loss, and Scalable Throughput (L4S), 2023 (Year: 2023).*
(Continued)

*Primary Examiner* — Michael A Keller
(74) *Attorney, Agent, or Firm* — Ruggiero McAllister & McMahon LLC

(57) ABSTRACT

A system and method for reducing bottleneck queues in the O-RAN architecture through classification of a PDCP queue at a CU-UP server with a CU Congestion Indicator, and classification of a RLC queue at a DU server with a DU Congestion Indicator. The CU Congestion Indicator determines a category for the PDCP queue for a DRB, x and the DU Congestion Indicator determines a category for the RLC queue for a DRB, y. The DU server transmitting the CE indication to UE when the CU Congestion Indicator or the DU Congestion Indicator classifies the DRB x or DRB y as CE, which in turn, communicates a congestion occurrence to an application source. The application source modifies a data rate for data traffic that is sent to the UE based on the CE indication.

17 Claims, 10 Drawing Sheets

(51) Int. Cl.
| | |
|---|---|
| *H04W 76/20* | (2018.01) |
| *H04W 80/02* | (2009.01) |
| *H04W 80/06* | (2009.01) |

(56) References Cited

U.S. PATENT DOCUMENTS

| | | | | |
|---|---|---|---|---|
| 8,923,115 | B2 * | 12/2014 | Pelletier | H04W 28/0205 |
| | | | | 370/229 |
| 9,100,871 | B2 * | 8/2015 | Nadas | H04W 28/10 |
| 9,787,595 | B2 * | 10/2017 | Yiu | H04W 76/12 |
| 9,893,774 | B2 * | 2/2018 | Shattil | H04W 24/00 |
| 10,116,712 | B2 * | 10/2018 | Ma | H04L 65/765 |
| 10,476,804 | B2 * | 11/2019 | Miklós | H04L 47/11 |
| 10,785,677 | B2 * | 9/2020 | Welin | H04W 28/0278 |
| 10,931,729 | B2 * | 2/2021 | Fujishiro | H04W 28/22 |
| 11,057,870 | B2 * | 7/2021 | Huang | H04W 72/02 |
| 11,457,372 | B2 * | 9/2022 | Byun | H04W 40/12 |
| 11,582,757 | B2 * | 2/2023 | Cui | H04W 24/10 |
| 11,751,096 | B2 * | 9/2023 | Liu | H04W 28/0268 |
| | | | | 370/235 |
| 11,917,527 | B2 * | 2/2024 | Chou | H04W 48/18 |
| 12,114,292 | B2 * | 10/2024 | Huang | H04W 72/04 |
| 2009/0285099 | A1 * | 11/2009 | Kahn | H04L 47/115 |
| | | | | 370/236 |
| 2011/0222406 | A1 * | 9/2011 | Persson | H04L 47/24 |
| | | | | 370/236 |
| 2012/0039169 | A1 * | 2/2012 | Susitaival | H04W 28/12 |
| | | | | 370/230 |
| 2012/0147750 | A1 * | 6/2012 | Pelletier | H04W 8/04 |
| | | | | 370/235 |
| 2014/0003242 | A1 * | 1/2014 | Nadas | H04L 47/17 |
| | | | | 370/235 |
| 2014/0022900 | A1 * | 1/2014 | Salot | H04W 28/0284 |
| | | | | 370/235 |
| 2014/0233390 | A1 * | 8/2014 | Schmid | H04L 47/125 |
| | | | | 370/236 |
| 2015/0271087 | A1 * | 9/2015 | Yiu | H04W 8/04 |
| | | | | 370/230 |
| 2017/0164238 | A1 * | 6/2017 | Paredes Cabrera | H04W 28/22 |
| 2017/0251394 | A1 * | 8/2017 | Johansson | H04W 28/0284 |
| 2017/0366311 | A1 * | 12/2017 | Iyer | H04B 7/0482 |
| 2018/0183724 | A1 * | 6/2018 | Callard | H04L 47/6295 |
| 2018/0270743 | A1 * | 9/2018 | Callard | H04W 28/0268 |
| 2019/0297527 | A1 * | 9/2019 | Liu | H04W 28/02 |
| 2020/0045587 | A1 * | 2/2020 | Choi | H04W 28/22 |
| 2021/0007096 | A1 * | 1/2021 | Huang | H04L 1/1887 |
| 2021/0258866 | A1 * | 8/2021 | Chou | H04W 24/02 |
| 2021/0266907 | A1 * | 8/2021 | Cui | H04W 24/10 |
| 2021/0409335 | A1 * | 12/2021 | Zhu | H04L 47/24 |
| 2022/0369151 | A1 * | 11/2022 | Manja Ppallan | H04L 65/80 |
| 2023/0292291 | A1 * | 9/2023 | Huang | H04W 24/02 |
| 2024/0031295 | A1 * | 1/2024 | Bharadwaj | G06F 3/0659 |
| 2024/0276292 | A1 * | 8/2024 | Liu | H04L 47/263 |
| 2024/0334243 | A1 * | 10/2024 | Taneja | H04W 28/0284 |
| 2024/0373285 | A1 * | 11/2024 | Cai | H04W 28/0289 |
| 2025/0008367 | A1 * | 1/2025 | Sahin | H04W 28/0289 |
| 2025/0081032 | A1 * | 3/2025 | Cai | H04W 28/0289 |
| 2025/0081033 | A1 * | 3/2025 | Yang | H04W 28/0268 |
| 2025/0133023 | A1 * | 4/2025 | Östberg | H04W 28/0289 |
| 2025/0150402 | A1 * | 5/2025 | Östberg | H04L 47/33 |
| 2025/0175852 | A1 * | 5/2025 | Vasas | H04W 28/0289 |
| 2025/0193676 | A1 * | 6/2025 | Sun | H04B 17/336 |
| 2025/0219958 | A1 * | 7/2025 | Bouchebbah | H04L 47/2416 |
| 2025/0227548 | A1 * | 7/2025 | Talebi Fard | H04W 28/0268 |
| 2025/0233819 | A1 * | 7/2025 | Russell, Jr. | H04W 28/0268 |
| 2025/0233828 | A1 * | 7/2025 | Russell, Jr. | H04W 24/08 |
| 2025/0234244 | A1 * | 7/2025 | Russell, Jr. | H04L 43/0882 |
| 2025/0274806 | A1 * | 8/2025 | Talebi Fard | H04W 28/0289 |
| 2025/0274810 | A1 * | 8/2025 | Talebi Fard | H04W 28/02 |
| 2025/0358671 | A1 * | 11/2025 | Kanamarlapudi | |
| | | | | H04W 28/0268 |
| 2025/0392952 | A1 * | 12/2025 | Kassir | H04W 28/0268 |
| 2026/0006108 | A1 * | 1/2026 | Yi | H04L 69/161 |
| 2026/0012421 | A1 * | 1/2026 | Rossbach | H04L 47/115 |
| 2026/0012847 | A1 * | 1/2026 | Rossbach | H04W 28/0278 |

FOREIGN PATENT DOCUMENTS

| | | | | |
|---|---|---|---|---|
| CN | 102833783 | A * | 12/2012 | |
| CN | 102833783 | B * | 4/2015 | |
| CN | 102763385 | B * | 6/2016 | H04L 47/34 |
| CN | 106465177 | A * | 2/2017 | H04W 76/12 |
| CN | 104507122 | B * | 8/2018 | H04W 28/12 |
| CN | 108702242 | A * | 10/2018 | H04W 72/52 |
| CN | 111050341 | A * | 4/2020 | H04W 28/0289 |
| CN | 111065120 | A * | 4/2020 | H04W 28/0289 |
| CN | 112352449 | A * | 2/2021 | H04L 47/2483 |
| CN | 112468405 | A * | 3/2021 | H04L 47/12 |
| CN | 112512080 | A * | 3/2021 | H04W 28/0289 |
| CN | 109076506 | B * | 4/2021 | H04W 72/23 |
| CN | 109792631 | B * | 6/2021 | H04L 47/11 |
| CN | 111050341 | B * | 2/2022 | H04W 28/0289 |
| CN | 111065120 | B * | 2/2022 | H04W 28/0289 |
| CN | 112468405 | B * | 5/2022 | H04L 47/12 |
| CN | 108064058 | B * | 11/2022 | H04W 28/0278 |
| CN | 116491215 | A * | 7/2023 | H04W 76/15 |
| CN | 116782248 | A * | 9/2023 | H04W 72/04 |
| CN | 117641441 | A * | 3/2024 | H04W 28/0289 |
| CN | 117835316 | A * | 4/2024 | H04L 47/26 |
| CN | 117981287 | A * | 5/2024 | H04L 47/31 |
| CN | 117998450 | A * | 5/2024 | H04L 5/0055 |
| CN | 118104289 | A * | 5/2024 | H04W 28/0284 |
| CN | 118140461 | A * | 6/2024 | H04W 28/0289 |
| CN | 118869597 | A * | 10/2024 | H04W 28/0289 |
| CN | 119030927 | A * | 11/2024 | H04L 47/31 |
| CN | 116491215 | B * | 12/2024 | H04W 76/19 |
| CN | 119422361 | A * | 2/2025 | H04W 28/0284 |
| CN | 119895808 | A * | 4/2025 | H04L 47/127 |
| CN | 119895933 | A * | 4/2025 | H04W 28/02 |
| CN | 119923832 | A * | 5/2025 | H04L 47/11 |
| CN | 120090974 | B * | 7/2025 | H04L 47/50 |
| CN | 120642411 | A * | 9/2025 | H04L 47/26 |
| CN | 120982164 | A * | 11/2025 | H04W 48/10 |
| CN | 121264020 | A * | 1/2026 | H04W 28/0289 |
| EP | 1926257 | A1 * | 5/2008 | H04L 47/17 |
| EP | 2471302 | B1 * | 3/2014 | H04W 8/04 |
| EP | 2524477 | B1 * | 4/2016 | H04W 28/0284 |
| EP | 3076618 | B1 * | 9/2017 | H04L 47/12 |
| EP | 2777317 | B1 * | 6/2018 | H04W 28/0284 |
| EP | 3499820 | A1 * | 6/2019 | H04L 47/11 |
| EP | 3120605 | B1 * | 1/2020 | H04L 47/11 |
| EP | 3192299 | B1 * | 1/2020 | H04W 28/0284 |
| EP | 3569013 | B1 * | 5/2021 | H04W 36/0064 |
| EP | 3895376 | B1 * | 10/2023 | H04L 41/147 |
| EP | 4440074 | A1 * | 10/2024 | H04L 47/26 |
| EP | 4440189 | A1 * | 10/2024 | H04L 47/26 |
| ES | 2703980 | T3 * | 3/2019 | H04W 72/542 |
| GB | 2577531 | | 4/2020 | |
| GB | 2577531 | A * | 4/2020 | H04L 47/2483 |
| JP | 6363231 | B2 * | 7/2018 | H04W 76/12 |
| JP | 2020507252 | A * | 3/2020 | H04W 36/0044 |
| JP | 6908712 | B2 * | 7/2021 | H04W 36/0064 |
| KR | 20160108461 | A * | 9/2016 | H04W 76/12 |
| KR | 20240019599 | A * | 2/2024 | H04W 28/0278 |
| KR | 20240033937 | A * | 3/2024 | H04L 43/08 |
| KR | 20240163139 | A * | 11/2024 | H04W 28/0284 |
| KR | 20250114456 | A * | 7/2025 | H04W 88/085 |
| TW | I740713 | B * | 9/2021 | H04W 72/12 |
| TW | I787095 | B * | 12/2022 | H04W 72/04 |
| TW | 202337243 | A * | 9/2023 | G06N 3/0442 |
| WO | WO-2008064983 | A2 * | 6/2008 | H04L 47/17 |
| WO | WO-2010107355 | A1 * | 9/2010 | H04W 8/04 |
| WO | WO-2011025438 | A1 * | 3/2011 | H04W 8/04 |
| WO | WO-2012121635 | A1 * | 9/2012 | H04W 8/04 |
| WO | WO-2015081992 | A1 * | 6/2015 | H04W 72/1215 |
| WO | WO-2015139726 | A1 * | 9/2015 | H04L 47/122 |
| WO | WO-2015148157 | A1 * | 10/2015 | H04W 76/12 |
| WO | WO-2016039673 | A1 * | 3/2016 | H04L 12/6418 |
| WO | WO-2017144118 | A1 * | 8/2017 | H04W 72/52 |
| WO | WO-2017166814 | A1 * | 10/2017 | H04W 72/23 |
| WO | WO-2017172449 | A1 * | 10/2017 | H04L 1/0025 |
| WO | WO-2018053688 | A1 * | 3/2018 | H04L 45/24 |
| WO | WO-2018082597 | A1 * | 5/2018 | H04W 28/0278 |
| WO | WO-2020121084 | A1 * | 6/2020 | H04L 41/147 |
| WO | WO-2021128911 | A1 * | 7/2021 | H04W 24/02 |

(56) References Cited

FOREIGN PATENT DOCUMENTS

| WO | WO-2021128913 A1 * | 7/2021 | ........ H04W 28/0284 |
|----|----|----|----|
| WO | WO-2017218794 A1 * | 12/2021 | .......... H04L 1/1861 |
| WO | 2022005344 | 1/2022 | |
| WO | WO-2022005344 A1 * | 1/2022 | ............ H04L 47/30 |
| WO | WO-2022022734 A1 * | 2/2022 | ............ H04W 92/22 |
| WO | WO-2022098279 A1 * | 5/2022 | ........ H04W 28/0284 |
| WO | WO-2022240064 A1 * | 11/2022 | .......... H04B 17/309 |
| WO | WO-2022268292 A1 * | 12/2022 | ............ H04W 80/02 |
| WO | WO-2023048627 A1 * | 3/2023 | ............ H04L 47/31 |
| WO | WO-2023048628 A1 * | 3/2023 | ........ H04W 28/0289 |
| WO | WO-2023048629 A1 * | 3/2023 | ........ H04W 28/0284 |
| WO | WO-2023179871 A1 * | 9/2023 | ........ H04W 28/0289 |
| WO | WO-2024016277 A1 * | 1/2024 | ........ H04W 28/0284 |
| WO | WO-2024043607 A1 * | 2/2024 | ............ H04L 5/0053 |
| WO | WO-2024060302 A1 * | 3/2024 | ............ H04L 47/34 |
| WO | WO-2024073966 A1 * | 4/2024 | ............ H04L 47/31 |
| WO | WO-2024093346 A1 * | 5/2024 | ........ H04W 28/0289 |
| WO | WO-2024097064 A1 * | 5/2024 | ........ H04W 28/0289 |
| WO | WO-2024207466 A1 * | 10/2024 | ............ H04L 47/26 |
| WO | WO-2024209042 A1 * | 10/2024 | ........ H04W 28/0289 |
| WO | WO-2024220100 A1 * | 10/2024 | ............ G06N 20/00 |
| WO | WO-2024253675 A1 * | 12/2024 | ............ H04W 28/20 |
| WO | WO-2025048689 A1 * | 3/2025 | ........ H04W 28/0289 |
| WO | WO-2025122175 A1 * | 6/2025 | ............ H04W 24/10 |
| WO | WO-2025144511 A1 * | 7/2025 | ............ H04L 47/33 |
| WO | WO-2025155057 A1 * | 7/2025 | ............ H04W 88/08 |
| WO | WO-2025240764 A1 * | 11/2025 | ............ H04L 47/33 |
| WO | WO-2025240925 A1 * | 11/2025 | ............ H04L 47/33 |
| WO | WO-2025264416 A1 * | 12/2025 | ............ H04L 47/26 |

OTHER PUBLICATIONS

Extended European Search Report for corresponding European application 24163422.9, 7 pages, dated Jul. 12, 2024.

3GPP TS 38.323, v.17.3.0 3rd Generation Partnership Project: Technical Specification Group Radio Access Network; NR; Packet Data Convergence Protocol (PDCP) Specification (Release 17); Dec. 2022.

3GPP TS38.425, v. 17.2.0 3rd Generation Partnership Project: Technical Specification Group Radio Access Network; NG-RAN; NR User Plane Protocol (Release 17); Dec. 2022.

Briscoe et al"RFC 9330: Low Latency, Low Loss, and Scalable Throughput (L4S) Internet Service: Architecture" Internet Engineering Task Force (IETF); Jan. 2023.

De Schepper et al."RFC 9331: The Explicit Congestion Notification (ECN) Protocol for Low Latency, Low Loss, and Scalable Throughput (L4S)" Internet Engineering Task Force (IETF); Jan. 2023.

K. De Schepper et al.: "RFC 9332: Dual-Queue Coupled Active Queue Management (AQM) for Low Latency, Low Loss, and Scalable Throughput (L4S)" Internet Engineering Task Force (IETF); Jan. 2023.

Ramakrishnan et al "RFC 3168: The Addition of Explicit Congestion Notification (ECN) to IP" Internet Engineering Task Force (IETF); Sep. 2001.

* cited by examiner

| Bits | 7 | 6 | 5 | 4 | 3 | 2 | 1 | 0 | Number of Octets |
|---|---|---|---|---|---|---|---|---|---|
| | PDU Type (=0) | | | | Spare | DL Discard Blocks | DL Flush | Report polling | 1 |
| | Spare | | L4S | Request Out of Seq Report | Report Delivered | User data existence flag | Assistance Info Report Polling Flag | Retransmission flag | 1 |
| | NR-U Sequence Number | | | | | | | | 3 |
| | DL discard NR PDCP PDU SN | | | | | | | | 0 or 3 |
| | DL discard Number of blocks | | | | | | | | 0 or 1 |
| | DL discard NR PDCP PDU SN start (first block) | | | | | | | | 0 or 3 |
| | Discarded Block size (first block) | | | | | | | | 0 or 1 |
| | ... | | | | | | | | |
| | DL discard NR PDCP PDU SN start (last block) | | | | | | | | 0 or 3 |
| | Discarded Block size (last block) | | | | | | | | 0 or 1 |
| | DL report NR PDCP PDU SN | | | | | | | | 0 or 3 |
| | L4S Extension (x1,x2) | | | | | | | | 0 or 1 |
| | Padding | | | | | | | | 0-3 |

Adding new L4S Extension in DL User Data (PDU Type 0) Format (used between CU-UP and DU)

Adding L4S flag to indicate whether or not L4S extension present in this PDU

FIG. 2

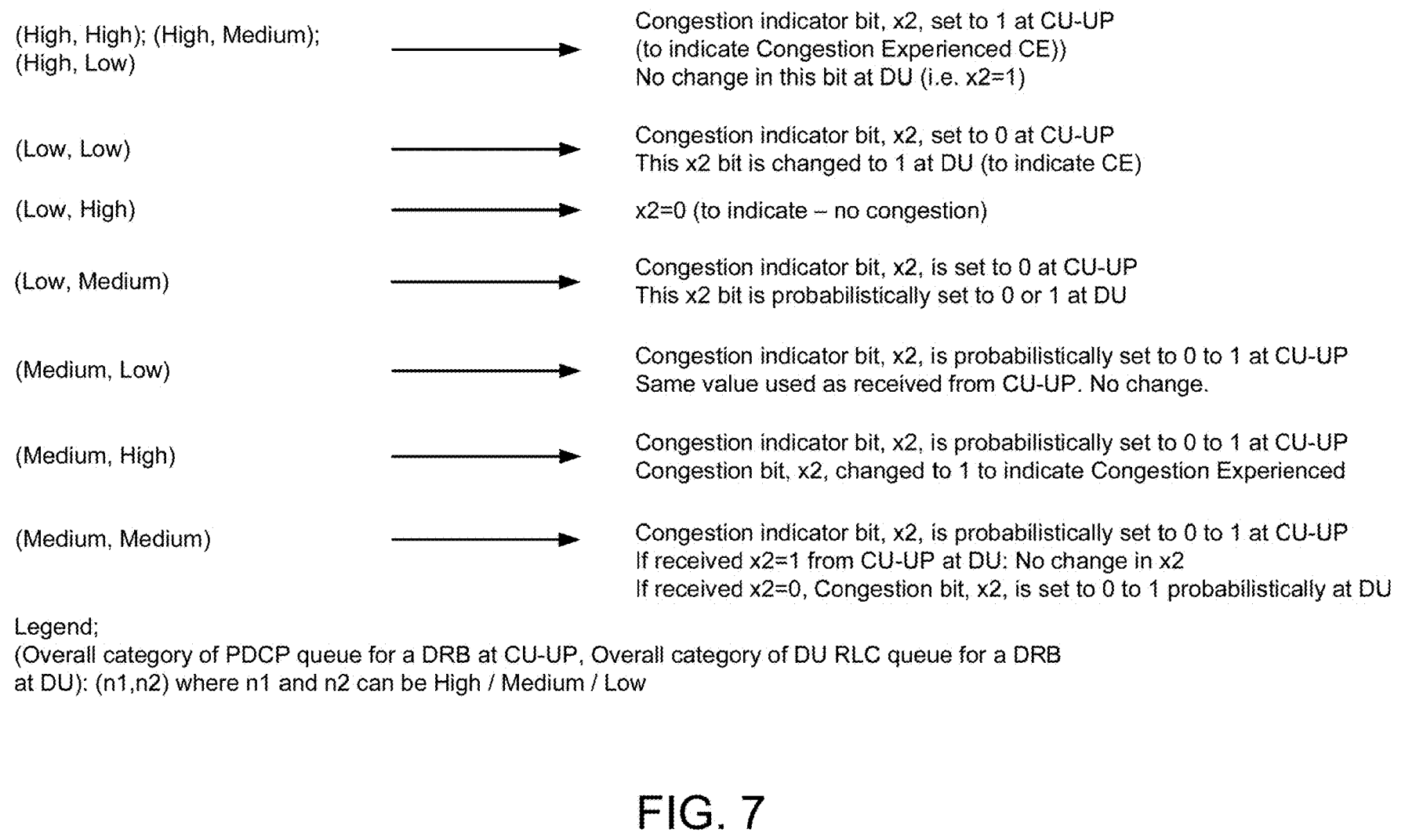

(High, High); (High, Medium); (High, Low) → Congestion indicator bit, x2, set to 1 at CU-UP (to indicate Congestion Experienced CE)) No change in this bit at DU (i.e. x2=1)

(Low, Low) → Congestion indicator bit, x2, set to 0 at CU-UP This x2 bit is changed to 1 at DU (to indicate CE)

(Low, High) → x2=0 (to indicate – no congestion)

(Low, Medium) → Congestion indicator bit, x2, is set to 0 at CU-UP This x2 bit is probabilistically set to 0 or 1 at DU (Medium, Low) → Congestion indicator bit, x2, is probabilistically set to 0 to 1 at CU-UP Same value used as received from CU-UP. No change.

(Medium, High) → Congestion indicator bit, x2, is probabilistically set to 0 to 1 at CU-UP Congestion bit, x2, changed to 1 to indicate Congestion Experienced (Medium, Medium) → Congestion indicator bit, x2, is probabilistically set to 0 to 1 at CU-UP If received x2=1 from CU-UP at DU: No change in x2 If received x2=0, Congestion bit, x2, is set to 0 to 1 probabilistically at DU Legend;
(Overall category of PDCP queue for a DRB at CU-UP, Overall category of DU RLC queue for a DRB at DU): (n1,n2) where n1 and n2 can be High / Medium / Low

FIG. 7

RAN AND UE DRIVEN L4S MARKING AND PROCESSING FOR CONGESTION MANAGEMENT IN AN O-RAN BASED NETWORK ARCHITECTURE

CROSS REFERENCE TO RELATED APPLICATIONS

This application claims benefit under 35 USC § 119 of Indian Provisional Patent Application No. 202321024078 filed Mar. 30, 2023, the entire contents of which are incorporated herein by reference.

BACKGROUND

1. Field of the Invention

The present disclosure is related to bottleneck queues in the Open Radio Access Network (O-RAN) architecture. More particularly, the present disclosure is related to reducing or eliminating bottlenecks through classification of Packet Data Convergence Protocol (PDCP) and Radio Link Control (RLC) queues at the Centralized Unit-User Plane (CU-UP) for congestion management in Radio Access Networks (RAN).

2. Description of Related Art

Low Latency, Low Loss, and Scalable throughput (L4S) architecture enables Internet applications to achieve relatively low queuing latency, low congestion loss and scalable throughput control. The main concepts of L4S are provided below.

Explicit Congestion Notification (ECN): ECN is an extension to the Internet Protocol and to the Transmission Control Protocol (TCP) and is defined in RFC 3168 (2001). ECN allows end-to-end notification of network congestion without dropping packets. ECN uses two bits in the IP header for notification of congestion in the network when a packet is ECN Capable Transport (ECT) enabled. Four different codepoints supported by ECN for L4S are used.

1. Binary codepoint 00, Non-ECT. If a source marks a packet as Non-ECT, this packet does not support ECN and cannot be marked as Congestion Experienced (CE) if congestion occurs at a network node.
2. Binary codepoint 01, ECT(1). This is used for L4S Capable Transport. In this case, a packet is sent in the L4S queue at a network node (and not in the classic queue). Also, the packet supports ECN and can be marked as Congestion Experienced (CE) by network nodes if congestion occurs.
3. Binary codepoint 10, ECT(0), ECN Capable Transport but not L4S Capable. In this case, the packet needs to be sent in the classic queue at a network node and not in the L4S queue.
4. Binary codepoint 11, Congestion Experienced (CE).

The L4S capable network node supports two queues-a Classic queue (for non-L4S packets) and an L4S queue (for L4S packets). Packets with non-ECT and ECT(0) codepoints are sent to the classic queue and other packets with codepoints ECT(1) and CE are sent to the L4S queue. In the L4S architecture, a network node marks packets as CE (Congestion Experienced) in the L4S queue as soon as a queuing delay in that node exceeds a threshold.

For the above, network nodes are required to distinguish L4S traffic from classic traffic for co-existence and incremental deployment. For ensuring low latency, L4S relies on Accurate ECN, which allows the sender to react more finely according to the congestion level, but which requires an adapted transport stack, such as TCP-Prague.

Scalable Congestion Control protocol in end hosts: These methods adapt the rate of the sender node proportionally to the number of congestion signals received. During congestion, these methods decrease the rate of the sender node (in proportion to the number of CE-marked packets received at the receiver) and this decrease is less than what one finds with the Classic congestion control methods (such as with TCP Reno). TCP Prague (used with L4S), DCTCP (Data Center TCP) and SCREAM (Self-Clocked Rate Adaptation for Multimedia) are examples of some protocols supporting scalable congestion control methods.

Active Queue Management (AQM) in bottleneck links: AQM drops packets from a queue before reaching its memory limits and improves performance of end-to-end flows. It can also mark packets instead of dropping them if input traffic is ECN capable. To improve the coexistence of different traffic types, L4S architecture uses DualQ Coupled AQM, which enables the fair sharing of bandwidth of the low-latency (LL) traffic and other best effort (BE) traffics, via a coupling between the two queueing algorithms.

This overall end-to-end procedure works as follows (with the L4S architecture) in the IP networks: 1) The source (or sender) indicates L4S support through the ECN codepoint 01; 2) the Network nodes identify a packet as an L4S packet and change the ECN bits to Congestion Experienced (CE with codepoint 11) when congestion occurs; 3) The receiver checks the ECN bits on receipt of a packet and notifies the source about the congestion if it receives a Congestion Experienced (CE) codepoint in the ECN bits; and 4) The source (or sender) adapts the sending rate as per the Scalable Congestion Control described above.

Open Radio Access Network (O-RAN) is based on disaggregated components which are connected through open and standardized interfaces based on 3GPP NG-RAN. An overview of O-RAN with disaggregated RAN CU (Centralized Unit), DU (Distributed Unit), and RU (Radio Unit), near-real-time Radio Intelligent Controller (RIC) and non-real-time RIC is illustrated in FIG. 1.

As noted with respect to FIG. 1, the CU and the DU are connected using the F1 interface (with F1-C for control plane and F1-U for user plane traffic) over a mid-haul (MH) path. One DU could host multiple cells (e.g., one DU could host 24 cells) and each cell may support many users. For example, one cell may support 600 Radio Resource Control (RRC) Connected users and out of these 600, there may be 200 Active users (i.e., users that have data to send at a given point of time).

A cell site could comprise multiple sectors and each sector may support multiple cells. For example, one site could comprise three sectors and each sector could support eight cells (with eight cells in each sector on different frequency bands). One CU-CP (CU-Control Plane) could support multiple DUs and thus multiple cells. For example, a CU-CP could support 1,000 cells and around 100,000 User Equipment (UE). Each UE could support multiple Data Radio Bearers (DRB) and there could be multiple instances of CU-UP (CU-User Plane) to serve these DRBs. For example, each UE could support 4 DRBs, and 400,000 DRBs (corresponding to 100,000 UEs) may be served by five CU-UP instances (and one CU-CP instance).

The DU could be located in a private data center, or it could be located at a cell-site. The CU could also be in a private data center or even hosted on a public cloud system. The DU and CU are typically located at different physical locations. The CU communicates with a 5G core system, which could also be hosted in the same public cloud system (or could be hosted by a different cloud provider). A RU (Radio Unit) is located at a cell-site and communicates with the DU via a front-haul (FH) interface.

The E2 nodes (CU and DU) are connected to the near-real-time RIC using the E2 interface. The E2 interface is used to send data (e.g., user, cell, slice Key Performance Measures or KPMs) from the RAN, and deploy control actions and policies to the RAN at near-real-time RIC. The application or service at the near-real-time RIC that deploys the control actions and policies to the RAN are called xApps. The near-real-time RIC is connected to the non-real-time RIC using the A1 interface.

L4S relies on ECN bits in the IP header and the ability of network nodes to mark these bits as needed by the L4S architecture to manage congestion in the network. While the L4S architecture allows for scalable throughput, there are three types of bottleneck queues in O-RAN architecture, which are described below.

1. Internet Protocol (IP) queues. IP queues at the intermediate routers between the 5G core network and the CU-UP, or between the 5G CU-UP and the 5G DU.
2. Packet Data Convergence Protocol (PDCP) queues. As previously discussed, CU-UP and DU could be located in different data centers and could be physically located apart from each other (e.g. DU in a private data center or at cell site and the CU-UP 100 km away in a public cloud) in the O-RAN's disaggregated architecture. PDCP queue for a DRB at CU-UP stores PDCP SDUs (i.e. incoming IP packets from the 5G core network). Once it has transmitted PDCP Packet Data Units (PDUs) to DU, it also stores these PDUs in a retransmission queue until these are acknowledged by the DU. PDCP queue can build up if buffer occupancy is consistently quite high in the corresponding RLC queue in the DU. PDCP queue can also build up if the packet error rate is quite high over the mid-haul that is being used to connect DU and CU. The L4S architecture doesn't have visibility into it.
3. Radio Link Control (RLC) queues. RLC queues at the DU (for RLC SDUs/PDUs). The DL (downlink) RLC queue for a DRB at the DU stores RLC SDUs (or PDCP PDUs) that it receives from CU-UP in the downlink direction. The UE corresponding to this DRB (or the corresponding logical channel) could be experiencing poor channel conditions or high interference or cell-load could be quite high in the cell where the UE is located, and such conditions can result in queue build up for the corresponding DRB. The L4S architecture doesn't have visibility into it.

Current L4S architecture and associated mechanisms take care of congestion management taking into account the first type of queues (i.e. the IP queues at the intermediate routers). It doesn't really have visibility into the PDCP queues at the CU-UP and the RLC queues at the DU and the dynamic behavior of these queues in the O-RAN architecture as discussed above.

Prior art and limitations. Two approaches have been considered.

Existing Approach I: Mark Packets at the PDCP Layer.

Limitations of this approach: In 5G O-RAN disaggregated systems, RLC queues are at the DU and PDCP is at CU-UP, and DU and CU-UP could be located many kilometers apart. Marking at PDCP delays congestion signal (to the source of that application) as it marks new incoming packets to the RLC queue which are at the tail of the RLC queue. This becomes even worse in the O-RAN systems as the mid-haul latency between DU and CU could be on the order of few ms to few 10s of ms. An effective mechanism is needed to tackle this.

Existing Approach II: Do (RLC) Queuing at the PDCP Layer.

Limitation of this approach: In the disaggregated O-RAN architecture (for example, with 7.2 split), the MAC scheduler works on the RLC queues which are in the DU. If RLC queuing is done at PDCP layer in the CU-UP, an effective mechanism is still needed to send enough data to DU every slot to properly utilize air-interface capacity. Slot length could be 1 ms or 0.5 ms or even less but the mid-haul delay (i.e. mid-haul delay between DU and CU-UP) itself could be in 10s of ms. Thus, this approach is not really feasible for disaggregated O-RAN systems with commonly found mid-haul in the internet.

Accordingly, there is a need for a congestion management system that overcomes, alleviates, and/or mitigates the deleterious effects of prior art.

SUMMARY

Accordingly, what is desired is a system and method that effectively achieves low queuing latency, low congestion loss and scalable throughput control in a 5G cellular network.

It is further desired to provide a system and method that effectively achieves low queuing latency, low congestion loss and scalable throughput control using disaggregated O-RAN systems.

It is further desired to provide a system and method that has visibility of the dynamic behavior of PDCP queues and RLC queues in O-RAN architecture.

It is yet further desired to provide a system and method that effectively mitigates congestion due to PDCP queues at the CU-UP.

It is still further desired to provide a system and method that effectively mitigates congestion due to RLC queues at the DU.

In one configuration, a system is provided that focuses on a RAN and UE driven approach for congestion management in O-RAN networks for Low Latency, Low Loss, and Scalable throughput (L4S) traffic. In this approach, PDCP queues at the CU-UP and RLC queues at the DU are variously classified based on occupancy level and wait time. Additionally, an extension header in the New Radio Unlicensed (NR-U) header (or two reserved bits from the PDCP header) are used to communicate congestion indication from CU-UP to DU for each DRB. 5G NR-U is an evolution of the 4G LTE License Assisted Access (LAA) standards. 5G NR functions using the same radio access technology as 4G Long-Term Evolution (LTE) networks use—orthogonal frequency-division multiple access (OFDM). However, 5G NR utilizes newer techniques including QAM, beamforming, and features that increase the efficiency of a network and lower latency.

Two bits are used to indicate congestion for a DRB in the RAN. The first bit is used to indicate whether this DRB is carrying L4S traffic. The second bit is used to indicate the presence of congestion. This bit is updated as a packet moves from the CU-UP to the DU. The DU indicates congestion to the UE. The L4S capable UE uses this congestion indication and communicates congestion occurrence to the source using the ECN bits in the TCP header. In response, the L4S application source adapts its data rate for the traffic it sends to the UE.

The L4S capable UE continues to send CE indication using the TCP ECN bits to the application source until one of the following happens: the DU starts indicating in the L4S Medium Access Control (MAC) Control Element (L4S MAC CE) to the UE that this DRB is no longer experiencing congestion in the RAN, or the L4S sends a message indicating that it has adapted its rate in response to the TCP ECN-Echo, which it reduced from the UE.

The system will account for a category of the PDCP queue for a DRB at CU-UP (e.g., high, medium, low) and will utilize the bit pattern (x1, x2) from the CU-UP to the DU where the L4S module for CU-UP sets (x1, x2) to (1,1) for L4S aware traffic before sending this to the DU. Here, first bit 'x1 equals to 1' indicates that it is for L4S traffic and second bit 'x2 equals to 1' indicates congestion in the corresponding queue at CU-UP. The system will also account for a category of the RLC queue for a DRB at the DU (e.g., high, medium, low).

The system will analyze bottleneck queues/links on a case-by-case basis (e.g., RLC queue, PDCP queue, air-interface, Mid-haul link, etc.) and generate possible scenarios. The system will further update the bit pattern (x1, x2) from the CU-UP to the DU will provide an indication of congestion to UE when appropriate. For communicating congestion indication from the DU to UE, a new L4S MAC Control Element (MAC CE) may be used or reserved bits from the PDCP header may be used.

In another configuration, once an overall category for the RLC and the PDCP queues has been derived at the DU server, this is communicated to the CU-CP by adding suitable objects in the F1-C interface protocol. F1 is the interface that connects a 5G New Radio (NR) gNode B (gNB) CU to the gNB DU. This interface is applicable to the CU-DU split gNB Architecture. The control plane of the F1-C allows signaling between the CU-CP and the DU while the user plane of the F1-U allows the transfer of application data between CU-UP and DU.

Congestion to the UE is indicated by sending a suitable RRC message to the UE. For this purpose, a field is added in the UE-specific RRC message to indicate the occurrence of congestion. The UE uses the information received in the RRC message and indicates congestion to the source of that traffic by setting ECN bits in the TCP header (as part of TCP ECN-Echo message). Another RRC message is sent to inform UE once the congestion situation for that DRB (and the associated UE) clears up.

With the above approach, the L4S modules at the DU and the CU-UP decide whether to indicate congestion to UE. This congestion is indicated from the CU-UP to the DU with the help of a new L4S Extension Header in the NR-U DL Data PDU or using reserved bits in the PDCP header. The DU communicates this to the UE via a new L4S MAC CE or using reserved bits from PDCP header for L4S or with a modified RRC message (to carry L4S information). The UE uses the information received from the DU to indicate congestion to source of that traffic by setting ECN bits in the TCP header (if congestion was indicated by the DU to the UE).

For this application the following terms and definitions shall apply:

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration, a system for reducing bottleneck queues in the Open Radio Access Network (O-RAN) is provided comprising: a Centralized Unit-User Plane (CU-UP) server, a Distributed Unit (DU) server coupled to the CU-UP server, a User Equipment (UE) coupled to the DU server and an application source coupled to the UE. The system further comprises software executing on the CU-UP server comprising a CU Congestion Indicator that measures data congestion in a Packet Data Convergence Protocol (PDCP) queue of the CU-UP server, the CU Congestion Indicator analyzing and classifying a Data Radio Bearer (DRB) x in the PDCP queue. The system still further comprises software executing on the DU server comprising a DU Congestion Indicator that measures data congestion in a Radio Link Control (RLC) queue of the DU server, the DU Congestion Indicator analyzing and classifying a DRB y in the RLC queue. The system is provided such that if the CU Congestion Indicator or the DU Congestion Indicator classifies the DRB x or DRB y respectively as Congestion Experienced (CE), the DU server transmits the CE indication to the UE using L4S MAC Control Element (MAC CE). Additionally, the system is provided such that the UE uses the CE indication to communicate a congestion occurrence message to the application source using Explicit Congestion Notification (ECN) bits in a Transmission Control Protocol (TCP) header, and the application source modifies a data rate for data traffic that is sent to said UE based on the CE indication.

In another configuration, a method for reducing bottleneck queues in the Open Radio Access Network (O-RAN) having a Centralized Unit-User Plane (CU-UP) server, a Distributed Unit (DU) server coupled to the CU-UP server, a User Equipment (UE) coupled to the DU server and an application source coupled to the UE is provided, the method comprising the steps of: measuring data congestion in a Packet Data Convergence Protocol (PDCP) queue of the CU-UP server with a CU Congestion Indicator, the CU Congestion Indicator analyzing and classifying a Data Radio Bearer (DRB) x in the PDCP queue, measuring data congestion in a Radio Link Control (RLC) queue of the DU server with a DU Congestion Indicator, and the DU Congestion Indicator analyzing and classifying a Data Radio Bearer (DRB) y in the RLC queue. The method is provided such that when the CU Congestion Indicator or the DU Congestion Indicator classifies the DRB x or DRB y respectively as Congestion Experienced (CE), the DU server transmits the CE indication to the UE using the MAC Congestion Element or with the reserved bits of PDCP header. The method further comprises the steps where the UE communicates a congestion occurrence message to the application source based on the received CE indication, the UE transmitting the congestion occurrence message using Explicit Congestion Notification (ECN) bits in a Transmission Control Protocol (TCP) header, and the application source modifying a data rate for data traffic that is sent to the UE based on the CE indication.

The above-described and other features and advantages of the present disclosure will be appreciated and understood by those skilled in the art from the following detailed description, drawings, and appended claims.

DESCRIPTION OF THE DRAWINGS

FIG. 2 is shows adding a new L4S Extension in the DL User Data PDU Format (PDU Type 0) (where PDU Type 0 is specified in 3GPP TS 38.425). Note: "L4S Extension" field is newly added field/indicator in this disclosure. Other fields of this figure exist in 3GPP TS 38.425 but not the L4S Extension.

FIG. 7 is a illustrates the setting of the congestion bit at the CU-UP as per the category of PDCP queue and adaptation of this congestion bit at the DU depending on category of the RLC queue at DU and PDCP queue at the CU-UP for each DRB carrying L4S traffic.

DETAILED DESCRIPTION

Figure 1:
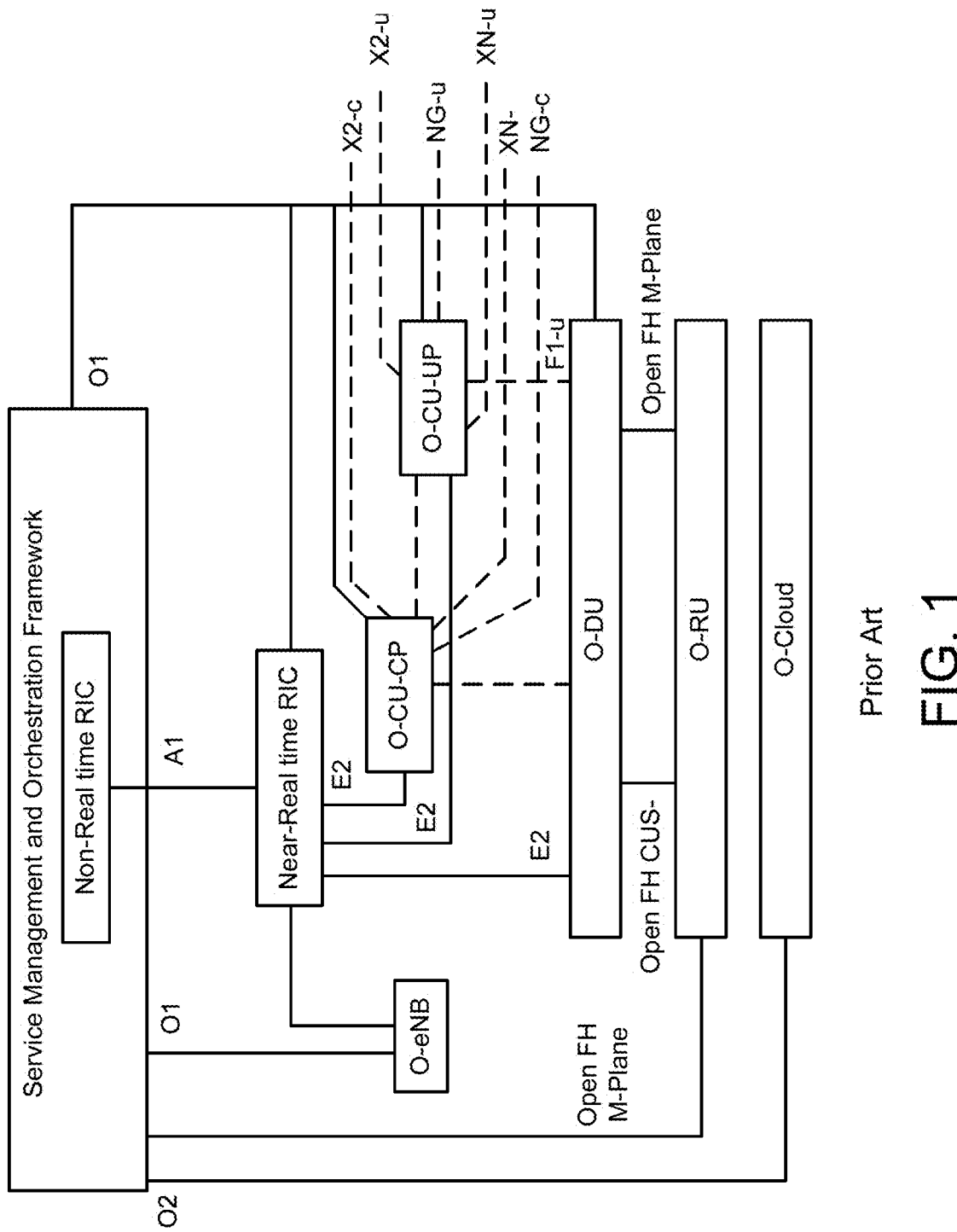
FIG. 1 is a block diagram of typical O-RAN architecture according to the prior art.

As discussed above, there are two categories of bottleneck queues in the O-RAN architecture for the downlink packets:

PDCP SDU/PDU queue at CU-UP. This queue stores PDCP SDUs (i.e. incoming IP packets from the core network). Once it has transmitted PDCP PDUs to DU, it also stores these PDUs in a retransmission queue until these are acknowledged by DU. PDCP queue can build up if buffer occupancy is consistently quite high in the corresponding RLC queue in DU. PDCP queue can also build up if the packet error rate is quite high over the mid-haul that is being used to connect DU and CU.

RLC SDU queue at DU. This queue stores PDCP PDUs (or RLC SDUs) of a DRB that it receives from CU-UP in the downlink direction. The UE corresponding to this DRB could be experiencing poor channel conditions or high interference or load could be quite high in that cell, and such conditions can result in queue build up for the corresponding DRB.

Classification of PDCP and RLC Queues for Congestion Management.

PDCP queues as well as RLC queues are classified in different categories for L4S based congestion management and this classification at CU-UP as can be seen with reference to FIG. 2. It should be noted that Routers/switches 1) between UPF/5G Core and CU-UP, and 2) between CU-UP and DU, are not shown in FIG. 2.

The downlink direction is discussed first. The UPF in 5G core network receives downlink data (i.e., IP packets) from a L4S server with (L4S indicated in the IP header). These downlink IP Packets are transported to SDAP (at CU-UP) via GTP-U tunnel. With respect to processing at CU-UP, these are enqueued in the PDCP SDU queue after processing at SDAP, ciphering, header compression and other operations are carried out in PDCP queue and PDCP PDUs are created, and PDCP PDUs are transmitted from CU-UP to DU.

Continuing the downlink direction description, the NR-U flow control protocol operates between CU-UP and DU, and the PDCP PDUs are received at DU and these are enqueued in the RLC SDU queue at DU. With respect to processing at the DU, the MAC scheduler takes scheduling decisions at the DU for each cell, selects logical channels of different UEs to serve and fetches data from RLC queues to transmit to the corresponding UEs, and the DU sends this downlink data to UE via the RU.

The uplink direction is now discussed. UE indicates status of reception of packets from the DU using the feedback mechanisms that exist between DU and UE. The DU retransmits certain packets (to UE) if UE indicates that these were not correctly received. These packets in the UL direction are processed at Phy, MAC and RLC layers at the DU. The DU transmits UL packets to CU-UP. These are processed at PDCP and SDAP (of CU-UP) and then are sent toward the core network.

I. Classification Type I (for RLC Queues)

Occupancy level of RLC queue defined at the DU (at time t) for a DRB as follows:

The occupancy of the RLC queue at the DU for a DRB is High if the occupancy of the RLC queue stays above a threshold, rlc_high_threshold, for a minimum time interval, time_high_rlc_threshold.

The occupancy of the RLC queue at the DU for a DRB is Low if occupancy level of the RLC queue stays below a threshold, rlc_low_threshold, for a minimum time interval, time_low_rlc_threshold.

This RLC occupancy is classified as Medium if it doesn't fall in any of the above categories.

II. Classification Type II (for RLC Queues)

The waiting times are considered of RLC packets in the RLC queue at DU and different categories of these queues are defined to aid congestion management in O-RAN based L4S networks.

Given end-to-end delay target for a DRB for a given 5QI (5G QoS Class), a delay target is allocated for processing in the DU. Note that the RLC queueing delay is typically a significant component of this. As a MAC scheduler at the DU schedules packets from the RLC queue for a DRB (or associated Logical Channel), a difference between actual time for which that RLC packet waited in the RLC queue and the corresponding delay target in the DU for each RLC packet from that DRB is computed. At time t, this difference in waiting and target delay for last z RLC PDUs for that DRB is added and this aggregate difference in delay is divided by z to compute average difference in delay. Here, the value of z can be configured, or its value can be changed dynamically.

If it is determined that this average difference in delay is above a threshold, rlc_waiting_high_threshold, then the delay deficit of this RLC queue is high, and this queue is classified in the High category for congestion management.

If it is below a threshold, rlc_waiting_low_threshold, then the delay deficit of this RLC queue is low, and this queue is categories in the Low category for congestion management.

Otherwise, the delay deficit of this RLC queue is classified in the Medium category.

III. Classification Type III (for RLC Queues)

The above delay deficit metric of RLC queue and occupancy levels of RLC queue are considered in defining an overall queue Category of each RLC queue for congestion purposes queues carrying L4S traffic. Table 1 defines an overall category of RLC queues for congestion management purposes for RLC queues carrying L4S traffic.

TABLE 1

| DU RLC queue category using delay deficit (from RLC Classification Type II above) | DU RLC queue category using the occupancy level of RLC queue (from RLC Classification Type I) | Overall category of DU RLC queue (for congestion management purposes) |
| --- | --- | --- |
| High | High or Medium | High |
| High | Low | Medium |
| Medium | High | High |
| Medium | Medium, Low | Medium |
| Low | High | Medium |
| Low | Medium, Low | Low |

B. Classification of PDCP Queues for Congestion Management

CU-UP could experience congestion in a PDCP queue due to a variety of reasons.

One reason is because of high input downlink traffic for that DRB from the core network but the CU-UP is not able to send to the DU as the corresponding RLC queue in the DU has no buffer space available. This could happen if the corresponding UE is in poor channel condition or experiencing interference from neighboring cells or the L2 scheduler is not able to serve this queue properly at the DU due to a high load in the cell.

Another reason is because of a high packet error rate at the mid-haul, which connects the CU-UP and the DU, and this is causing the CU-UP queues to build up.

Each PDCP queue carrying L4S traffic is classified to be in the High/Medium/Low category for congestion management as per Section A.

I. Classification Type I (for PDCP Queues)

Occupancy level of PDCP queue at the CU-UP (at time t) is defined for a DRB as follows.

Occupancy of the PDCP queue at the CU-UP for a DRB is high if the occupancy of PDCP queue stays above a threshold, pdcp_high_threshold, for a minimum time interval, time_high_pdcp_threshold.

Occupancy of the PDCP queue at the CU-UP for a DRB is Low if occupancy level of this PDCP queue stays below a threshold, pdcp_low_threshold, for a minimum time interval, time_low_pdcp_threshold.

This occupancy is classified as Medium if it doesn't fall in any of the above categories.

II. Classification Type II (for PDCP Queues)

The waiting time of PDCP packets is considered in the PDCP queue at the CU-UP and different categories of these queues to aid congestion management in the O-RAN based L4S networks are defined.

Given an end-to-end delay target for a DRB, a delay target for processing of PDCP packets in the CU-UP is allocated. One example uses 5QI 9 (5G QoS Identifier) to standardized QoS characteristics mapping from 3GPP TS 23.501. For 5QI 9, packet delay budget (PDB) is specified as 300 mS. Depending on the delay characteristics of different parts of the network such as mid-haul delay (i.e., between DU and CU-UP), backhaul delay (i.e. between CU-UP and User Plane Function in the 5G core network), RLC queueing delay in the DU and other delay components in a specific network deployment, a delay target is assigned for processing of a packet in the CU-UP to be 10 mS. Note this also includes the queuing delay at the CU-UP. In this example, 10 mS becomes the target delay in the CU-UP for DRB carrying 5QI 9 packets.

As the CU-UP transmits a PDCP PDU to the DU from the PDCP queue, a difference between the actual time for which that PDCP PDU waited in the PDCP queue and the corresponding delay target in the CU-UP for PDCP packets from that DRB is computed. At time t, this difference in waiting and target delay is added for last y PDCP PDUs for that DRB and an average difference in delay is determined by dividing this aggregate difference in delay by y. Here, the value of y can be configured, or the value can be changed dynamically. If this average difference in delay is above a threshold, pdcp_waiting_high_threshold, the delay deficit of this PDCP queue is categorized as high.

If it is below a threshold, pdcp_waiting_low_threshold, the delay deficit of this PDCP queue is categorized as low.

Otherwise, the delay deficit of this PDCP queue is categorized in the Medium category.

III. Classification Type III (for PDCP Queues)

The above two approaches are combined and define an overall queue Category of PDCP queues for congestion purposes for L4S traffic as shown below. Table 1 defines an overall category of PDCP queue for congestion management purposes.

TABLE 2

| Delay deficit of PDCP queue (from Classification Type II) | Occupancy level of PDCP queue (from Classification Type I) | Overall category of PDCP queue (for congestion management purposes) |
| --- | --- | --- |
| High | High | High |
| High | Medium or Low | Medium |
| Medium | High | High |
| Medium | Medium | Medium |
| Medium | Low | Low |
| Low | High | Medium |
| Low | Medium, Low | Low |

C. CU-UP Indicating Congestion Information to DU.

L4S modules are hosted at the CU-UP and the DU. To indicate Congestion from the CU-UP to the DU for a PDCP queue, add a new extension header for L4S in the NR-U DL user data PDU format (PDU type 0) and this is shown in FIG. 2. Note that the NR-U DL user data PDU formats are specified in the 3GPP TS 38.425. This new L4S extension carries the following:

Bit pattern (x1,x2) with x1=1 for L4S traffic and x2=1 indicate occurrence of congestion (or x2=0 to indicate that the corresponding PDCP queue is no longer experiencing congestion at CU-UP).

Figure 3:
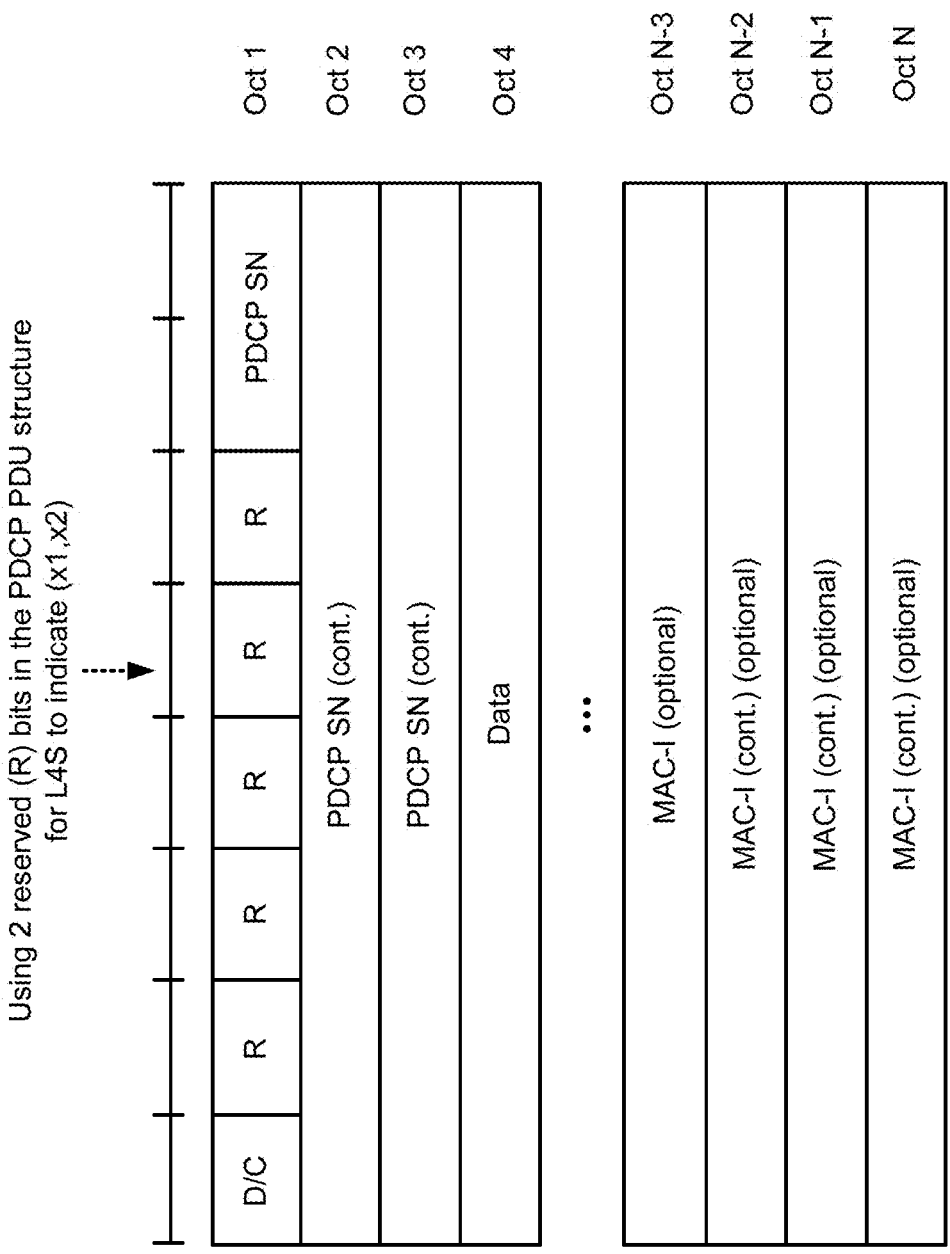
FIG. 3 illustrates using reserved (R) bits from the PDU structure (3GPP TS 38.323) for L4S.

Alternatively, two reserved bits from the PDCP header can be used for this purpose as illustrated in FIG. 3. First bit, x1, is used to indicate whether this DRB is carrying L4S traffic. Second bit, x2, is used to indicate occurrence (or absence) of congestion.

D. RAN and UE Driven Approach for Congestion Management in the O-RAN Networks for L4S Traffic.

Figure 4:
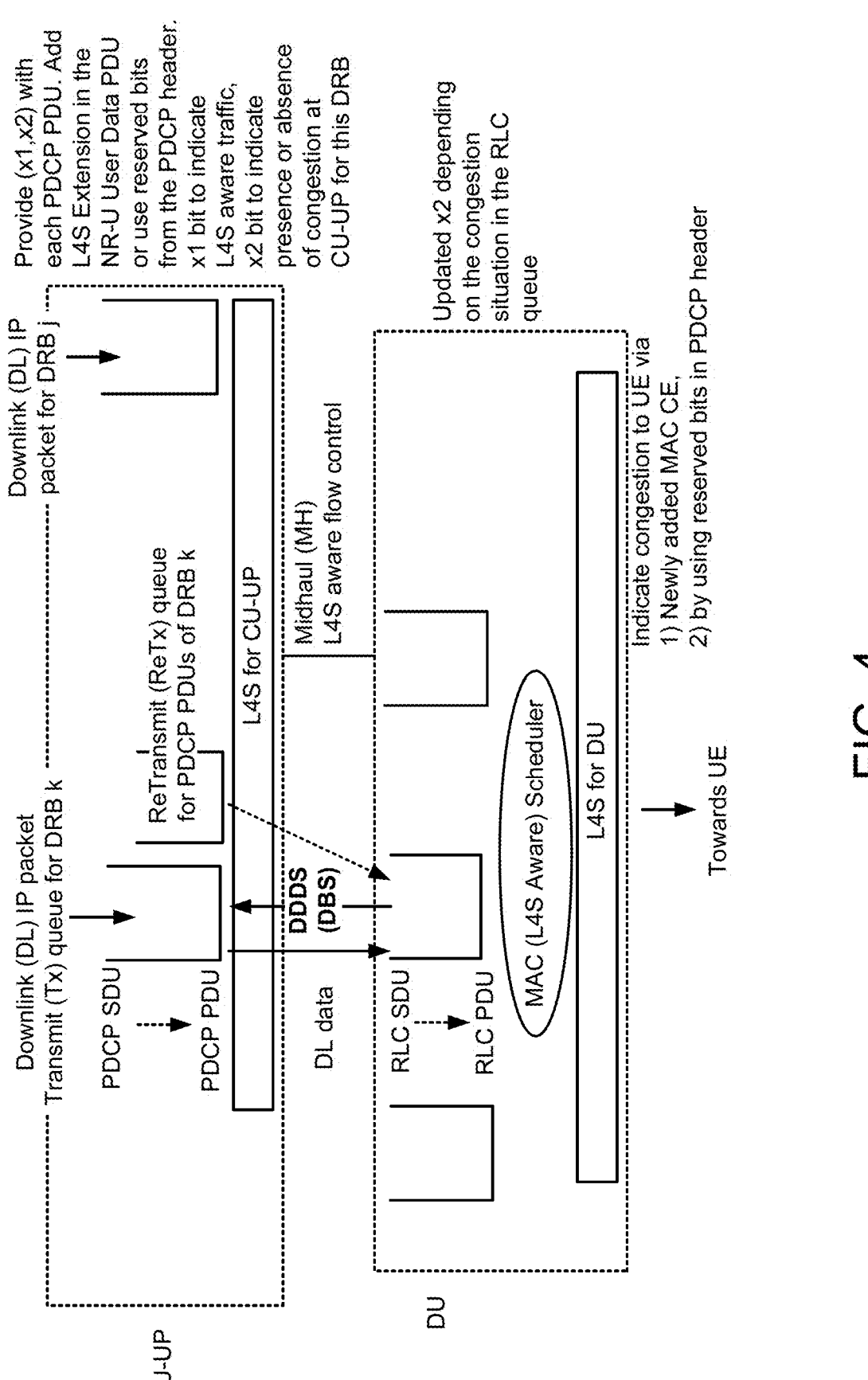
FIG. 4 is a block diagram illustrating L4S marking and packet processing for O-RAN architecture according to one configuration of the invention.
Figure 5:
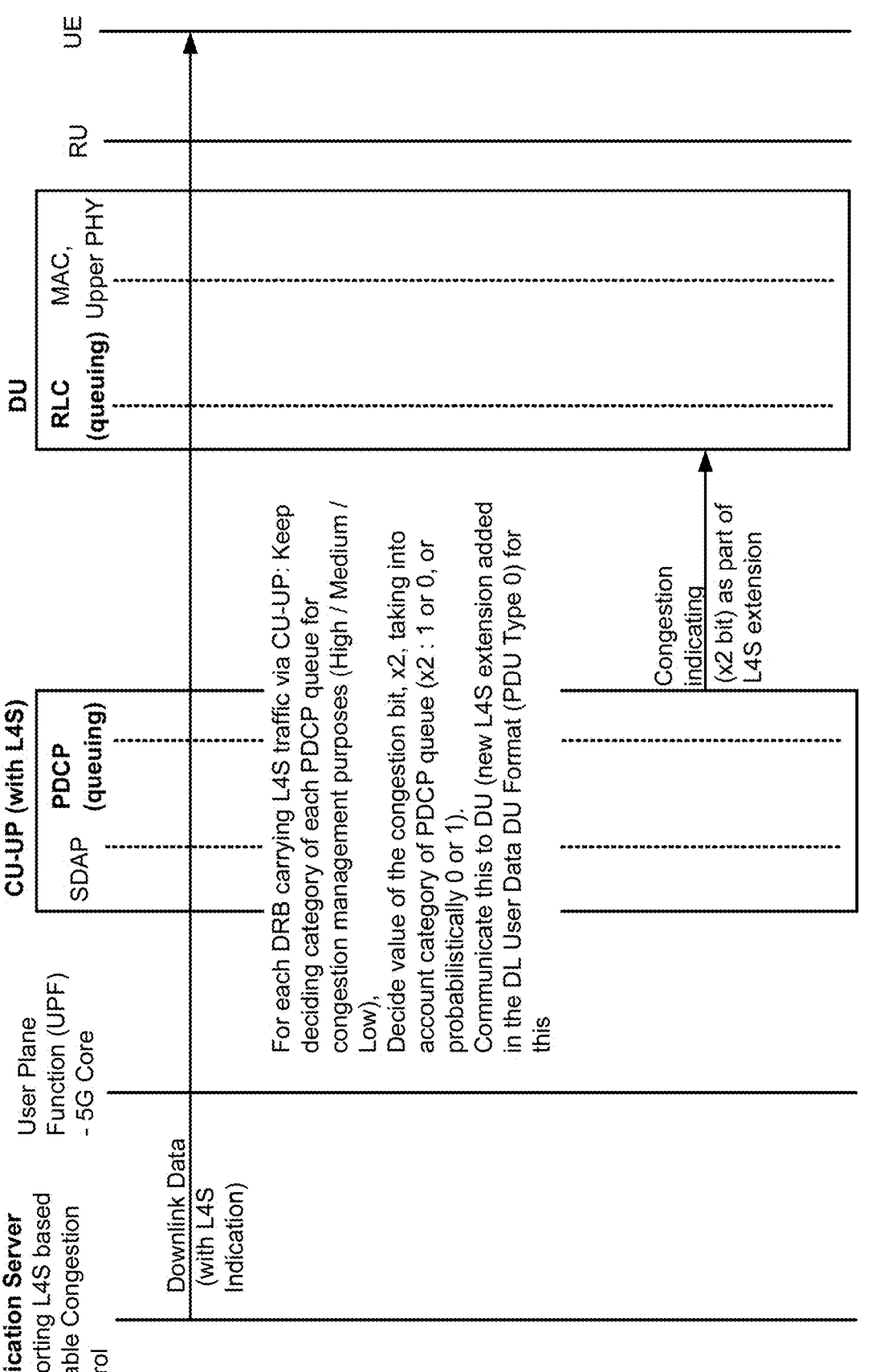
FIG. 5 is a block diagram showing data flow for deciding a category of each L4S PDCP queue at CU-UP, deciding a value of congestion bit and communicating to DU using a newly added L4S extension.
Figure 6:
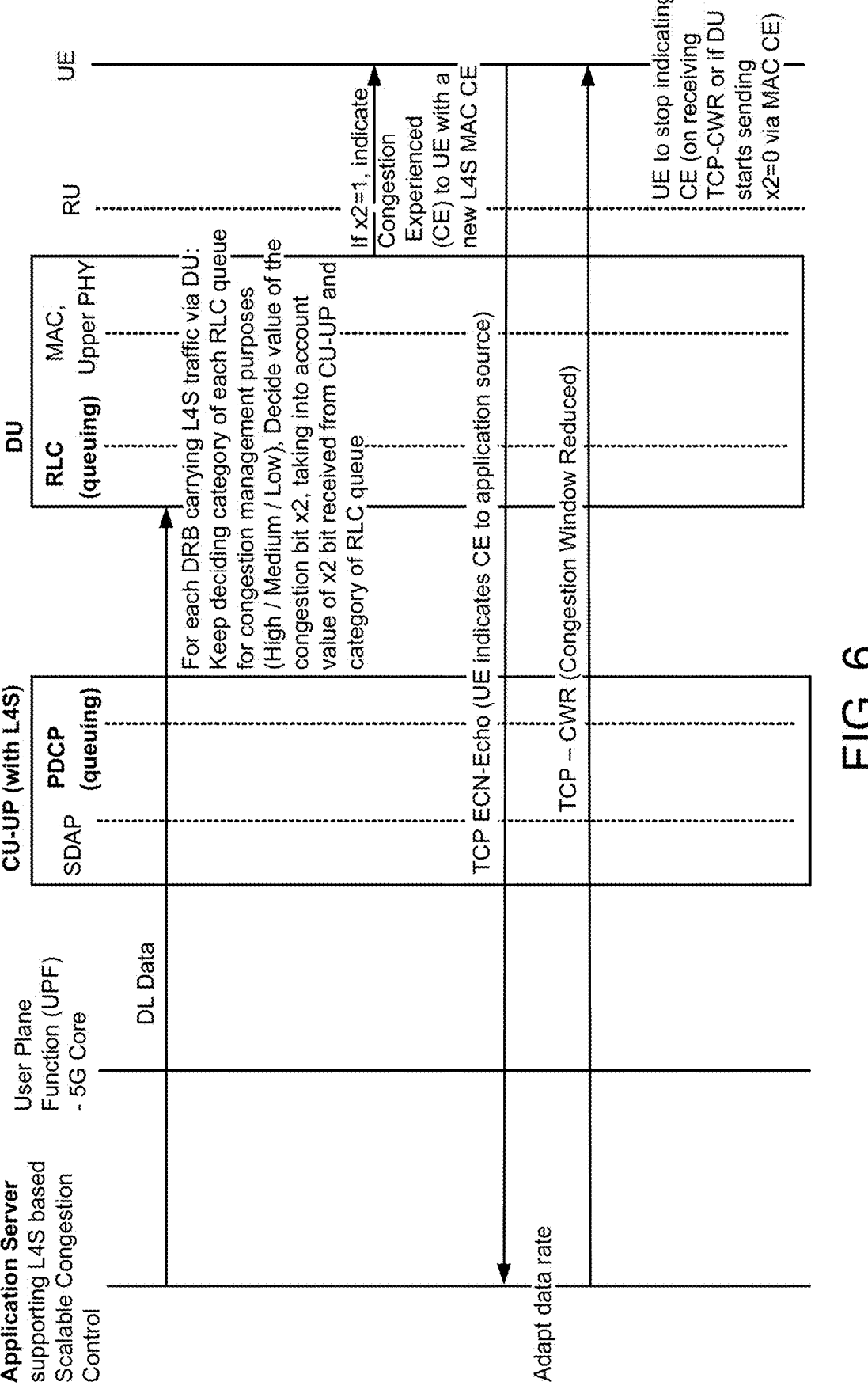
FIG. 6 is a block diagram continuing FIG. 5 for deciding a category of each RLC queue carrying L4S traffic at the DU, using congestion indication communicated from the CU-UP for the associated DRB and the RLC queue category to derive value of the congestion bit, x2, and communicating to the UE via the new L4S MAC CE according to FIG. 5.

In this method, referring to FIGS. 4, 5 & 6 the following process is performed for a given DRB:

Classify PDCP queues at the CU-UP as in Section B above and classify RLC queues at the DU as in Section A above. An extension header in the NR-U header (or two reserved bits from the PDCP header) are used to communicate congestion indication from CU-UP to DU for each DRB as in Section C above.

Two bits (x1, x2) are used to indicate congestion for a DRB in the RAN. First bit, x1, is used to indicate whether this DRB is carrying L4S traffic. The second bit, x2, is used to indicate the presence of congestion. In deciding the value of the congestion bit, x2, the category of the PDCP queue (x2: 1 or 0, or probabilistically 0 or 1) is considered. This bit is updated as a packet moves from the CU-UP to the DU (and the new L4S extension added in the DL User Data PDU format (PDU Type 0) is utilized). The DU indicates congestion to the UE (if needed) using a new MAC Control Element (MAC CE) added for this purpose (or using the reserved bits from the PDCP header).

For each DRB carrying L4S traffic via the DU, the method includes continually deciding a category of each RLC queue for congestion management purposes (High/Medium/Low), and deciding a value of the congestion bit, x2, taking into account a value of the x2 bit received from the CU-UP and the category of the RLC queue. If x2=1, then the DU indicates congestion experienced to the UE with a new L4S MAC CE.

The L4S capable UE uses this congestion indication in the method and communicates congestion occurrence to the source using the ECN bits in the TCP header (as part of TCP ECN-Echo message). In response, the L4S application source adapts its data rate for the traffic it sends to the UE (e.g., it counts the number of packets where Congestion Experienced is indicated and reduces data rate according to that).

The L4S capable UE continues to send CE indication using the TCP ECN bits to the application source until one of the following happens:

The DU starts indicating in the L4S MAC CE to the UE that this DRB is no longer experiencing congestion in RAN (i.e., UE stops indicating CE if DU starts sending x2=0 via MAC CE), or the L4S sends a message, TCP-Congestion Window Received (TCP-CWR), indicating that it has adapted its rate (e.g., reduced its congestion window) in response to the TCP ECN-Echo, which it received from the UE (i.e., UE stops indicating CE on receiving TCP-Congestion Window Reduced (TCP-CWR) from Application Server).

E. Method to Decide Value of the RAN Congestion Indicator to the UE for a DRB Carrying L4S Traffic.

The value of the RAN congestion indicator for a DRB in the RAN is determined using the method described in FIG. 7.

Case I: Category of PDCP Queue for a DRB at CU-UP (as Per Sec. II-B): High.

The (x1, x2) bit pattern from CU-UP to DU (with x1=1 for L4S traffic): In this case, the L4S module for CU-UP sets (x1, x2) to (1,1) for L4S aware traffic before sending this to DU.

The category of RLC queue for a DRB at DU (as per Method II-A): High.

Bottleneck queues/links for this case: RLC queue, PDCP queue, air-interface, Mid-haul link.

Possible scenarios: DU is not able to serve this UE as the UE is experiencing bad channel conditions or high interference, or cell load is quite high.

Updating bit x2 at DU if needed: No change in (x1, x2) that was received from CU-UP. (x1, x2)=(1,1).

Indication of congestion to UE: UE indicates the occurrence of congestion in the RAN either via a new MAC CE or with reserved bits of PDCP PDU.

Case II: Category of PDCP Queue for a DRB at CU-UP: High

The (x1, x2) bit pattern from CU-UP to DU (with x1=1 for L4S traffic): In this case, the L4S module for CU-UP sets (x1, x2) to (1,1) for L4S aware traffic before sending this to DU.

The category of RLC queue for a DRB at DU: Low.

Bottleneck queues/links: PDCP queue, Mid-haul link.

Possible scenarios: This could happen if packet error rate over mid-haul is quite high or if mid-haul is not able to serve packets due to congestion.

Updating bit x2 at DU: (x1, x2)=(1,1).

Indication of congestion to UE: UE indicates the occurrence of congestion in the RAN.

Case III: Category of PDCP Queue for a DRB at CU-UP: High.

The (x1, x2) bit pattern from CU-UP to DU (with x1=1 for L4S traffic): In this case, the L4S module for CU-UP sets (x1,x2) to (1,1) for L4S aware traffic before sending this to DU.

The category of RLC queue for a DRB at the DU: Medium.

Bottleneck queues/links: PDCP queue, Mid-haul link, Air-Interface.

Possible scenarios: Could happen if packet error rate over mid-haul is quite high or if mid-haul not able to serve packets due to congestion. At the same time, UE may or may not be experiencing good channel conditions.

Updating bit x2 at DU: No change in x2. Here, (x1, x2)=(1,1).

Indication of congestion to UE: UE is indicated occurrence of congestion in the RAN.

Case IV: Category of PDCP Queue for a DRB at CU-UP (as Per the Sec. B): Low.

The (x1, x2) bit pattern from CU-UP to DU (with x1=1 for L4S traffic): In this case, the L4S module for CU-UP sets (x1, x2) to (1,0).

The category of RLC queue for a DRB at DU (as per the Method II-A): High

Bottleneck queues/links: RLC queue, air-interface.

Possible scenarios: DU not able to serve this UE as the UE experiencing bad channel conditions or high interference. This could also happen if the cell load is quite high.

Updating bit x2 at DU: Change x2 to 1. The (x1, x2) received from the CU-UP for this DRB: (1,0). Updated (x1, x2) at the DU=(1,1).

Indication of congestion to UE: UE is indicated occurrence of congestion in the RAN as there is congestion in the RLC queue.

Case V: Category of PDCP Queue for a DRB at CU-UP: Low.

The (x1, x2) bit pattern from CU-UP to DU (with x1=1 for L4S traffic): In this case, the L4S module for CU-UP sets (x1,x2) to (1,0) for L4S aware traffic before sending this to the DU.

The category of RLC queue for a DRB at DU: Low.

Bottleneck queues/links: None.

Updating bit x2 at DU if needed: No change in x2.

Indication of congestion to UE: No congestion indicated to the UE.

Case VI: Category of PDCP Queue for a DRB at the CU-UP: Low.

The (x1, x2) bit pattern from CU-UP to DU (with x1=1 for L4S traffic): L4S module for CU-UP sets (x1,x2) to (1,0).

The category of RLC queue for a DRB at the DU (as per the Sec. A): Medium.

Bottleneck queues/links: RLC queue, air-interface.

Updating bit x2 at the DU: L4S module at the DU sets x2 to 0 or 1 with probability of setting this to 1 increasing as the queue occupancy level (as defined in Sec. A-Type I) or the delay deficit of RLC packets (as in Sec. A-Type II) in the RLC queue increases for that DRB (or the associated logical channel) in the DU.

Indication of congestion to UE: To indicate congestion to UE for a packet (via newly added MAC CE or PDCP reserved bits) if (x1, x2)=(1,1) for that RLC PDU in DU. No congestion indicated otherwise.

Case VII: Category of PDCP Queue for a DRB at the CU-UP: Medium.

The (x1, x2) bit pattern from CU-UP to DU (with x1=1 for L4S traffic): x2 is set to 0 or 1 with probability of setting it to 1 increasing as queue occupancy (as in Sec. B-Type I) or delay deficit (as in Sec. B-Type II) increases in PDCP queue at the CU-UP. This probability is increased more aggressively as the PDCP queue occupancy level reaches closer to the High level.

The category of RLC queue for a DRB at DU: Low.

Bottleneck queues/links: PDCP queue, mid-haul link.

Possible scenarios: PDCP queues may be starting to build up. Could happen due to congestion or high packet error rate over mid-haul.

Updating bit x2 at DU if needed: Use same as received from CU-UP.

Indication of congestion to UE (if needed): To indicate congestion to UE for a packet (via newly added MAC CE or PDCP reserved bits) if (x1, x2)=(1,1) for that RLC PDU in DU. No congestion indicated to UE otherwise.

Case VIII: Category of PDCP Queue for a DRB at CU-UP: Medium.

The (x1, x2) bit pattern from CU-UP to DU (with x1=1 for L4S traffic): The L4S module at the CU-UP sets x2 for each PDCP PDU for this DRB to be 0 or 1 with probability of setting this to 1 increasing as the queue occupancy level (as in Sec. B-Type I) or delay deficit (as in Sec. B-Type II) for PDCP queue in CU-UP increases.

The category of RLC queue for a DRB at DU: High.

Bottleneck queues/links: RLC queue, PDCP queue, air-interface, Mid-haul link

Updating bit x2 at DU: Updates x2 to 1.

Indication of congestion to UE (if needed): UE is indicated occurrence of congestion in the RAN via newly added MAC CE or via the reserved bits in the PDCP header Case IX: Category of PDCP Queue for a DRB at CU-UP: Medium.

The (x1, x2) bit pattern from the CU-UP to the DU (with x1=1 for L4S traffic): L4S module at the CU-UP sets x2 for each PDCP PDU to be 0 or 1 with probability of setting this to 1 increasing as the queue occupancy level (as in Sec. B-Type I) or delay deficit (as in Sec. B-Type II) for PDCP queue for that DRB in the CU-UP increases.

The category of RLC queue for a DRB at DU: Medium.

Bottleneck queues/links: RLC queue, PDCP queue, mid-haul link, air-interface.

Updating bit x2 at DU: If x2=1 for a PDCP PDU received from DU, occurrence of congestion in RAN is communicated to the UE.

If x2=0 for a PDCP PDU received from DU, the L4S module at DU sets this to 0 or 1 with probability of setting this to 1 increasing as queue occupancy level (as in Method II-A-Type I) or delay deficit (as in Method II-A-Type II) for RLC packets in the DU for that DRB (or the associated logical channel) goes up.

Indication of congestion to UE: UE indicates occurrence of congestion in the RAN via newly added MAC CE or via the reserved bits in the PDCP header if x2=1 at DU for this PDCP PDU. No congestion indicated otherwise.

F. Communication of Congestion Indication from DU to UE

Congestion indication (such as Congestion Experienced in RAN for this DRB) is communicated from the DU to the UE using a new L4S MAC Control Element (MAC CE) or by using reserved bits from the PDCP header as described earlier.

In another configuration, the following method is used. Once an overall category for the RLC and the PDCP queues at the DU server has been derived, this is communicated to the CU-CP by adding suitable objects in the F1-C interface protocol. Congestion to the UE is indicated by sending a suitable RRC message to the UE. For this purpose, a field is added in the UE-specific RRC message to indicate the occurrence of congestion. The UE uses the information received in the RRC message and indicates congestion to the source of that traffic by setting ECN bits in the TCP header (as part of TCP ECN-Echo message). Another RRC message is sent to inform UE once the congestion situation for that DRB (and the associated UE) is clears up.

With the above approach, the L4S modules at the DU and the CU-UP decide whether to indicate congestion to UE. This congestion is indicated from the CU-UP to the DU with the help of the L4S Extension Header in the NR-U DL Data PDU or using reserved bits in the PDCP header. DU communicates this to the UE via a new L4S MAC CE or using reserved bits from PDCP header for L4S or with a modified RRC message (to carry L4S information) as described above. The UE uses the information received from the DU to indicate congestion to source of that traffic by setting ECN bits in the TCP header (if congestion was indicated by the DU to the UE).

G. L4S Marking and Related Packet Processing with Assistance from RIC

In the above methods it has been described that the L4S related decision making is distributed between DU, CU-UP and RIC. This alternate method allows an operator to specify its own policies for L4S marking and related processing, and at the same time, it helps to offload some of this computational work from CU-UP or DU to RIC. The L4S module at the DU classifies each RLC queue carrying L4S traffic based on the occupancy level and delay deficit of the corresponding queue into different classes. It also computes an overall category for RLC queue for each DRB (as described in Sec. A). Similarly, the CU-UP computes an overall category for each PDCP queue using its occupancy level and delay deficit as described in Sec. B.

Figure 8:
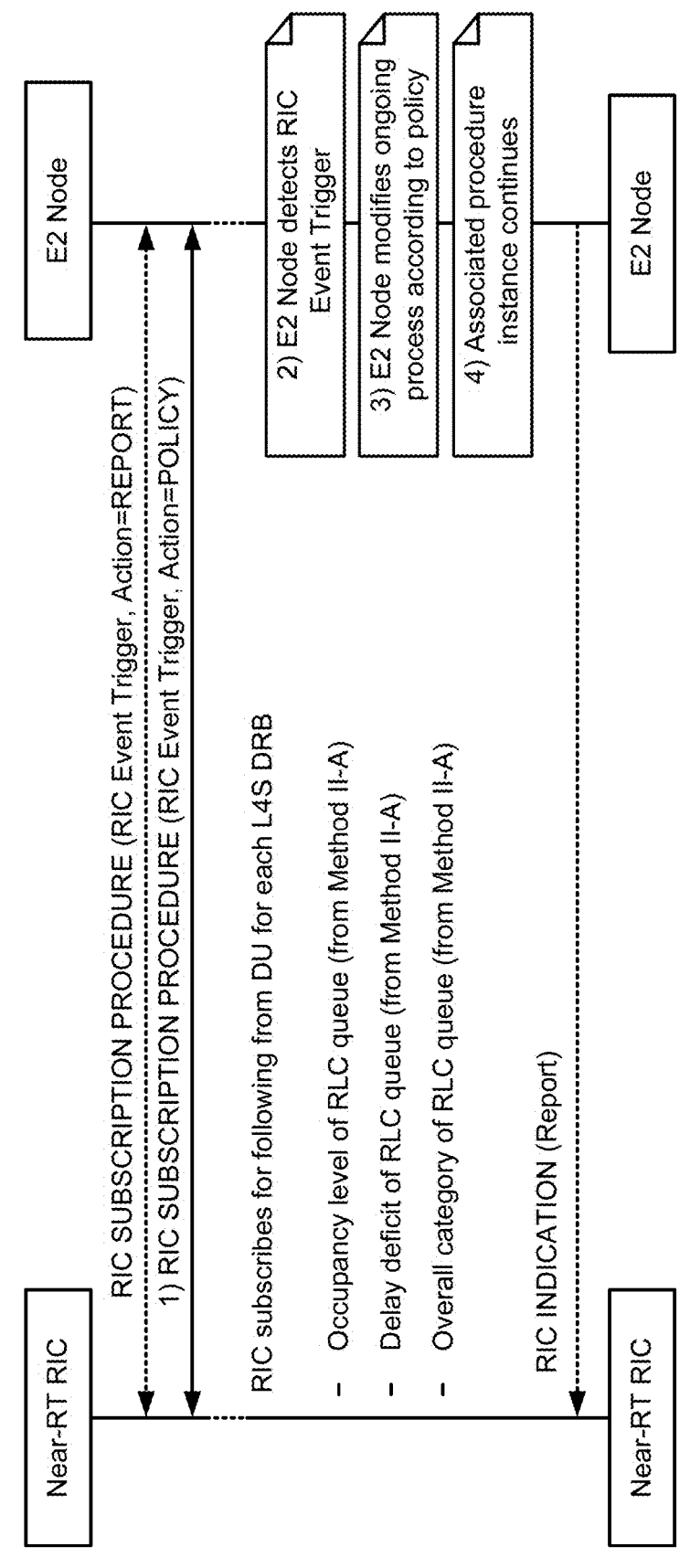
FIG. 8 illustrates near-RT (near-Real-Time) RIC subscribing to occupancy level, delay deficit and overall category of RLC queue for each DRB carrying L4S traffic.
Figure 9:
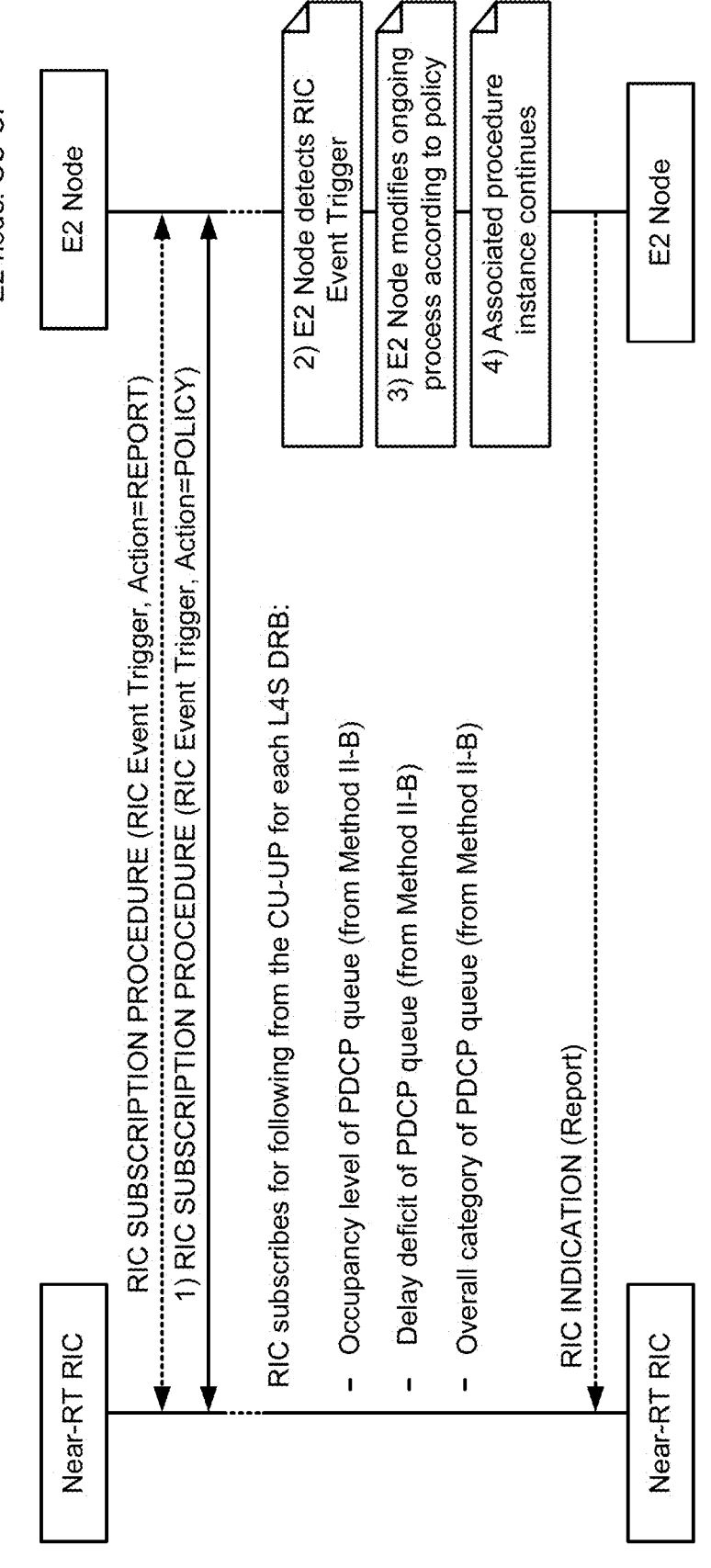
FIG. 9 illustrates near-RT (near-Real-Time) RIC subscribing to occupancy level, delay deficit and overall category of PDCP queue for each DRB.
Figure 10:
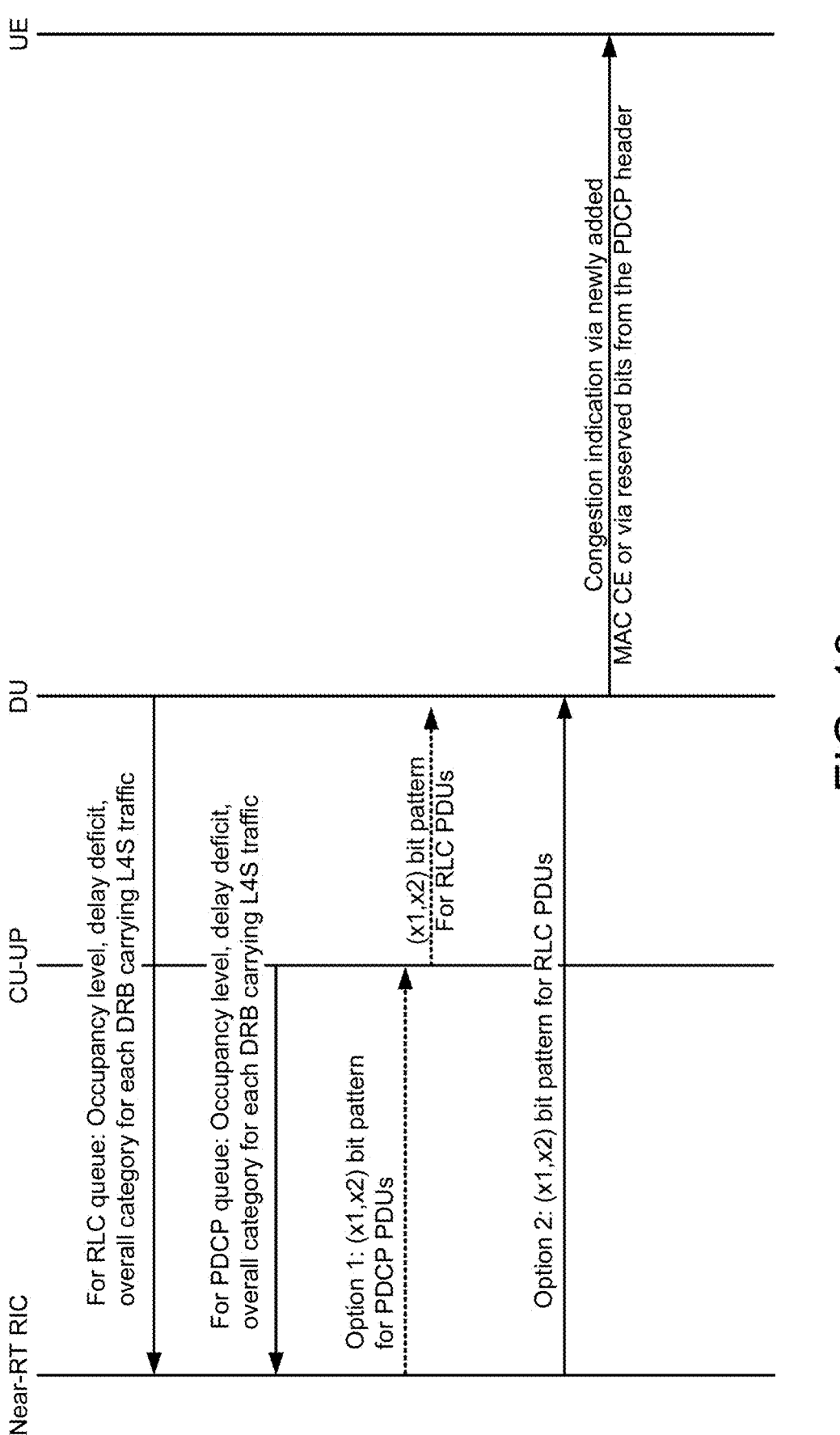
FIG. 10 shows L4S marking and associated processing distributed at near-RT (near-Real-Time) RIC. DU and CU-UP for O-RAN architecture.

The near-RT-RIC subscribes to various parameters from the DU and the CU-UP as shown in FIGS. 8-10.

Part of this computation can occur at the RIC also as shown in FIG. 10. The (x1, x2) bit pattern is computed at the RIC and communicated to the DU for the RLC PDUs (or to the CU-UP for the PDCP PDUs). To reduce the communication overhead, each E2 node (i.e., DU or CU-UP) can communicate information periodically or for a group of packets or based on some events (e.g., when the category of a queue changes to High from Medium or Low) to the RIC. Similarly, the RIC can also analyze information from a group of packets and provide (x1, x2) bit pattern after that.

With the above approach, the L4S modules at DU, CU-UP and RIC decide whether to indicate congestion to UE. This congestion is indicated to UE via MAC CE or reserved bits from PDCP header or via an enhanced RRC message. The UE indicates congestion to the source of that traffic by setting ECN bits in the TCP header as part of TCP ECN-Echo message. The source adapts its data rate as it gets Congestion Experienced signal for one or more DRBs. It also communicates TCP-Congestion Window Reduced (TCP-CWR) to the UE. The UE stops sending Congestion Experienced to the source on receiving TCP-CWR from the source or when it stops receiving Congestion Experienced bits from the DU as part of MAC-CE.

Alternatively, instead of sending MAC CE or reserved bits from PDCP header to UE to indicate congestion, a different approach may be taken. Once a category for each L4S PDCP and each L4S RLC queue using the methods proposed above is obtained, this can be used to recommend a suitable value of data rate for that UE in the UL direction. For example, if the PDCP as well as the RLC queue for a DRB is classified in the High category, a recommendation for a low value of uplink (UL) data rate to UE (for a short time interval) may be sent. Recommended Bit Rate MAC CE may be used. This is done for DRBs that are carrying downlink traffic, which depends on the uplink acknowledgements sent from UE. As low data rate in the UL direction are allocated, this helps to slow down acknowledgements that are sent in the UL direction and this in turn helps to slow down the data rate in the downlink direction too.

While the present disclosure has been described with reference to one or more exemplary embodiments, it will be understood by those skilled in the art that various changes may be made, and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A system for reducing bottleneck queues in the Open Radio Access Network (O-RAN) comprising:
   a Centralized Unit-User Plane (CU-UP) server;
   a Distributed Unit (DU) server coupled to said CU-UP server;
   a User Equipment (UE) coupled to said DU server;
   an application source coupled to said UE;
   software executing on said CU-UP server comprising a CU Congestion Indicator that measures data congestion in a Packet Data Convergence Protocol (PDCP) queue of said CU-UP server, the CU Congestion Indicator analyzing and classifying a Data Radio Bearer (DRB) x in the PDCP queue;
   software executing on said DU server comprising a DU Congestion Indicator that measures data congestion in a Radio Link Control (RLC) queue of the said DU server, the DU Congestion Indicator analyzing and classifying a DRB y in the RLC queue;

wherein if the CU Congestion Indicator or the DU Congestion Indicator classifies the DRB x or DRB y respectively as Congestion Experienced (CE), said DU server transmits a CE indication to said UE;
   said UE uses the CE indication to communicate a congestion occurrence message to said application source using: Low Latency, Low Loss, and Scalable throughput Medium Access Control (L4S MAC) Control Element (MAC CE) or Explicit Congestion Notification (ECN) bits in a Transmission Control Protocol (TCP) header from a PDCP header; and
   wherein said application source modifies a data rate for data traffic that is sent to said UE based on the CE indication.

2. The system according to claim 1, wherein the CU Congestion Indicator comprises an L4S module at said CU-UP server.

3. The system according to claim 1, wherein the ECN bits in the TCP header comprise two reserved bits from a PDCP header and are used to communicate the CE indication from said CU-UP server to said DU server for each DRB.

4. The system according to claim 3, wherein the first bit is used to indicate whether the DRB is carrying L4S traffic, and the second bit is used to indicate the CE indication.

5. The system according to claim 4, wherein the second bit is updated as a packet moves from said CU-UP server to said DU server.

6. The system according to claim 4, wherein the UE continues to send the CE indication to said application source until:
   said DU server indicates to the UE that a select DRB is no longer experiencing congestion; or
   said DU server sends a message to the UE indicating that said DU server has adapted a data transmission rate in response to information received from the UE.

7. The system according to claim 1, wherein
   the PDCP queue for DRB x at said CU-UP server is categorized as high, medium or low, and
   the RLC queue for DRB y at said DU server is categorized as high, medium or low.

8. The system according to claim 7, wherein once a category for the RLC or the PDCP queues has been derived at said DU server, the category is transmitted to the CU-CP server by adding objects in a F1-C interface protocol.

9. The system according to claim 8, wherein the CE indication is sent to said UE via a UE-specific Radio Resource Control (RRC) message.

10. The system according to claim 9, further comprising a field that is added in the UE-specific RRC message to indicate the occurrence of congestion.

11. The system according to claim 1, wherein the CU Congestion Indicator further monitors and classifies an air-interface and a Mid-haul link, which indications are transmitted to the UE.

12. The system according to claim 1, wherein the CE indication comprises L4S MAC Control Element (MAC CE).

13. A method for reducing bottleneck queues in the Open Radio Access Network (O-RAN) having a Centralized Unit-User Plane (CU-UP) server, a Distributed Unit (DU) server coupled to the CU-UP server, a User Equipment (UE) coupled to the DU server and an application source coupled to the UE, the method comprising the steps of:
   measuring data congestion in a Packet Data Convergence Protocol (PDCP) queue of the CU-UP server with a CU Congestion Indicator;

the CU Congestion Indicator analyzing and classifying a Data Radio Bearer (DRB) x in the PDCP queue;

measuring data congestion in a Radio Link Control (RLC) queue of the DU server with a DU Congestion Indicator;

wherein the DU Congestion Indicator analyzes and classifies a Data Radio Bearer (DRB) y in the RLC queue;

wherein when the CU Congestion Indicator or the DU Congestion Indicator classifies the DRB x or DRB y respectively as Congestion Experienced (CE), the DU server transmits the CE indication to the UE;

wherein the UE communicates a congestion occurrence message to the application source based on the received CE indication, the UE transmitting the congestion occurrence message using: L4S MAC Control Element (MAC CE) or Explicit Congestion Notification (ECN) bits in a Transmission Control Protocol (TCP) header from a PDCP header; and wherein the application source modifies a data rate for data traffic that is sent to the UE based on the CE indication.

14. The method according to claim 13, wherein the CU Congestion Indicator is an L4S module.

15. The method according to claim 13, wherein the ECN bits in the TCP header are two reserved bits from a PDCP header and are used to communicate the CE indication from the CU-UP server to the DU server for each DRB.

16. The method according to claim 15, wherein the first bit is used to indicate whether the DRB is carrying L4S traffic, and the second bit is used to indicate the CE indication.

17. The method according to claim 13, wherein the PDCP queue for DRB x at the CU-UP server is categorized as high, medium or low, and the RLC queue for DRB y at the DU server is categorized as high, medium or low.

\* \* \* \* \*